US010247284B2

(12) United States Patent
Kishida et al.

(10) Patent No.: US 10,247,284 B2
(45) Date of Patent: Apr. 2, 2019

(54) SINGLE-CAVITY TOROIDAL CONTINUOUSLY VARIABLE TRANSMISSION

(71) Applicant: NSK LTD., Tokyo (JP)

(72) Inventors: Hirotaka Kishida, Fujisawa (JP); Junji Ono, Fujisawa (JP)

(73) Assignee: NSK LTD., Tokyo (JP)

( * ) Notice: Subject to any disclaimer, the term of this patent is extended or adjusted under 35 U.S.C. 154(b) by 351 days.

(21) Appl. No.: 15/028,065

(22) PCT Filed: Apr. 2, 2014

(86) PCT No.: PCT/JP2014/059728
§ 371 (c)(1),
(2) Date: Apr. 8, 2016

(87) PCT Pub. No.: WO2015/052950
PCT Pub. Date: Apr. 16, 2015

(65) Prior Publication Data
US 2016/0238112 A1   Aug. 18, 2016

(30) Foreign Application Priority Data
Oct. 10, 2013 (JP) ................................ 2013-212418

(51) Int. Cl.
*F16H 15/38* (2006.01)
*F16H 61/664* (2006.01)

(52) U.S. Cl.
CPC ......... *F16H 15/38* (2013.01); *F16H 61/6649* (2013.01)

(58) Field of Classification Search
CPC .............................. F16H 15/38; F16H 61/6649
See application file for complete search history.

(56) References Cited

U.S. PATENT DOCUMENTS 5,547,432 A * 8/1996 Imanishi ................. F16C 19/30
384/604
5,575,736 A * 11/1996 Takemura ............... F16H 15/38
476/40
(Continued)

FOREIGN PATENT DOCUMENTS

JP  6-174030 A  6/1994
JP  6-229452 A  8/1994
(Continued)

OTHER PUBLICATIONS

International Search Authority, Written Opinion of the International Searching Authority for PCT/JP2014/059728 dated Jul. 8, 2014.
(Continued)

*Primary Examiner* — David M Fenstermacher
(74) *Attorney, Agent, or Firm* — Sughrue Mion, PLLC

(57) ABSTRACT

A single-cavity toroidal continuously variable transmission capable of suppressing gyro slippage and achieving mitigation of bearing loss and a longer service life. A pitch circle diameter (PCD) of the output-side bearing is smaller than that of the input-side bearing and a ball diameter of the output-side bearing is smaller than that of the input-side bearing. Therefore, centrifugal force acting on the ball of the output-side bearing on a speed increasing side with a low load can be suppressed. Therefore, gyro slippage can be suppressed and mitigation of bearing loss can be achieved. Furthermore, with a groove R ratio of the output-side bearing smaller than that of the input-side bearing, a longer service life can be achieved even when the pitch circle diameter (PCD) and ball diameter of the output-side bearing are smaller than those of the input-side bearing.

4 Claims, 5 Drawing Sheets

(56) References Cited

U.S. PATENT DOCUMENTS

| | | | |
|---|---|---|---|
| 6,176,805 B1* | 1/2001 | Itoh | F16C 19/163 384/450 |
| 6,306,059 B1* | 10/2001 | Yamada | F16H 37/086 475/214 |
| 6,592,491 B1* | 7/2003 | Machida | F16H 15/38 476/40 |
| 6,863,637 B2* | 3/2005 | Mori | F16H 15/38 476/40 |
| 7,033,302 B2* | 4/2006 | Nogi | F16H 15/38 384/614 |
| 7,967,719 B2* | 6/2011 | Smithson | F16H 15/28 476/37 |
| 2001/0044357 A1 | 11/2001 | Miyata et al. | |
| 2002/0173402 A1 | 11/2002 | Miller et al. | |
| 2003/0017906 A1* | 1/2003 | Mori | F16H 15/38 476/40 |

FOREIGN PATENT DOCUMENTS

| | | |
|---|---|---|
| JP | 9-4688 A | 1/1997 |
| JP | 11-132301 A | 5/1999 |
| JP | 2979945 B2 | 11/1999 |
| JP | 2004-530847 A | 10/2004 |
| JP | 2013-184656 A | 9/2013 |
| WO | 02/088573 A2 | 11/2002 |

OTHER PUBLICATIONS

International Search Report of PCT/JP2014/059728 dated Jul. 8, 2014 [PCT/ISA/210].
Communication dated Nov. 22, 2017 from the European Patent Office in counterpart Application No. 14852059.6.
Communication dated Aug. 22, 2017 from the Japanese Patent Office in counterpart Application No. 2013-212418.

* cited by examiner

[Fig. 1]
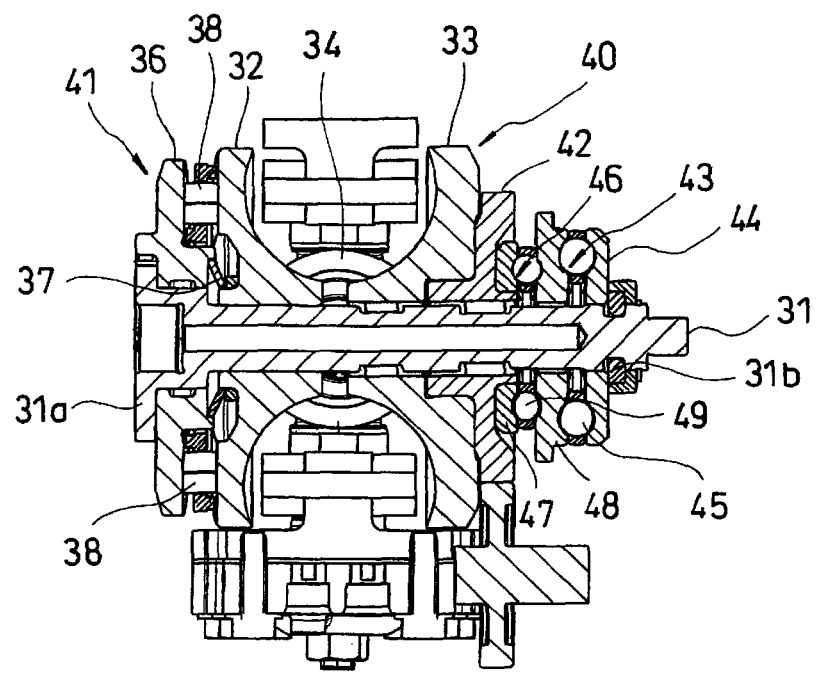

[Fig. 2]
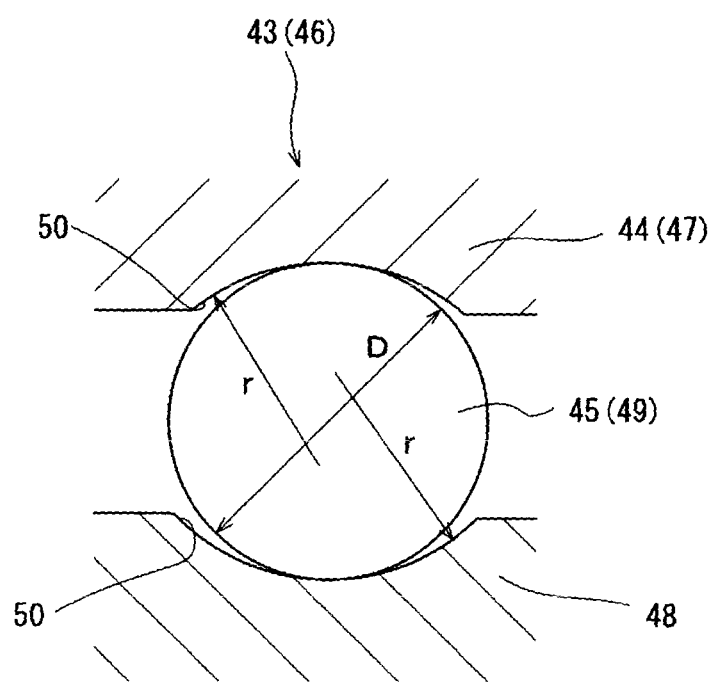

[Fig. 3]
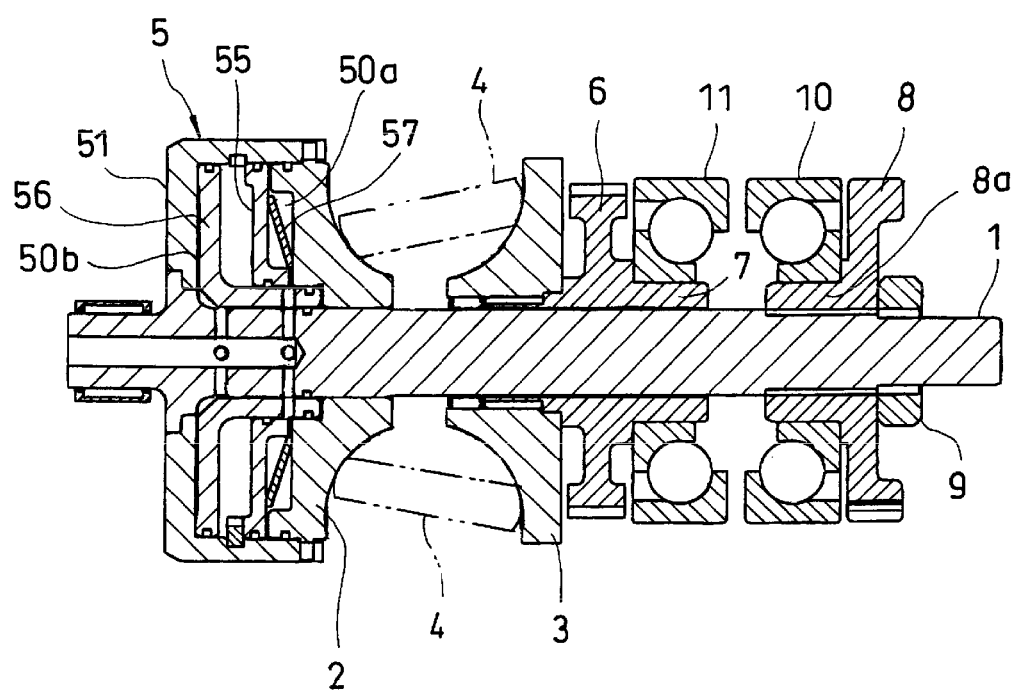

[Fig. 4]
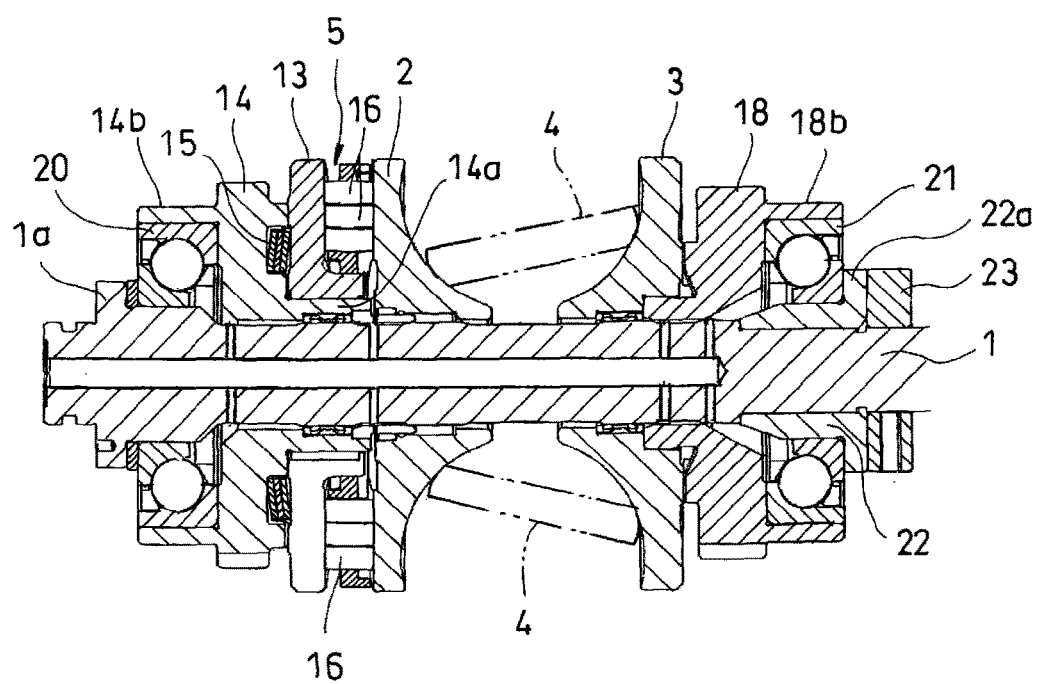

[Fig. 5]
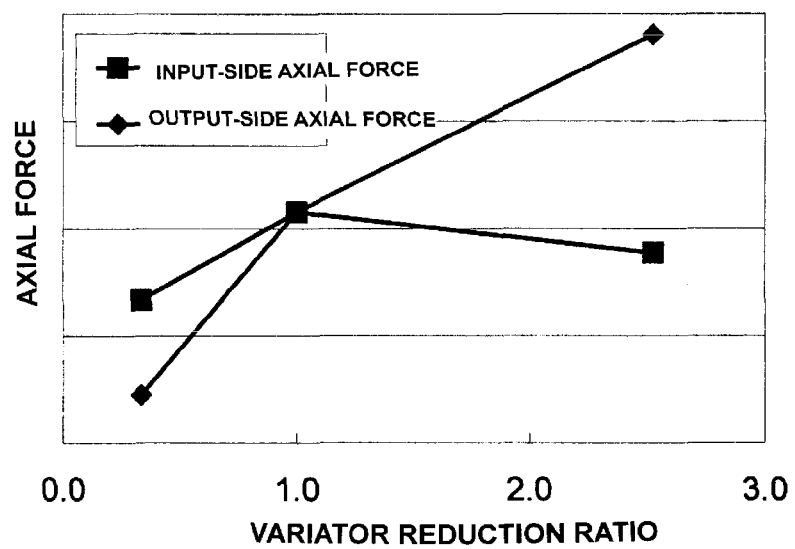

SINGLE-CAVITY TOROIDAL CONTINUOUSLY VARIABLE TRANSMISSION

CROSS REFERENCE TO RELATED APPLICATIONS

This application is a National Stage of International Application No. PCT/JP2014/059728, filed Apr. 2, 2014, claiming priority based on Japanese Patent Application No. 2013-212418, filed Oct. 10, 2013, the contents of all of which are incorporated herein by reference in their entirety.

TECHNICAL FIELD

The present invention relates to a single-cavity toroidal continuously variable transmission which can be used as a transmission for automobiles or various industrial machines.

BACKGROUND ART

Single-cavity toroidal continuously variable transmissions used as a transmission mainly for automobiles include a toroidal transmission mechanism (variator) where an input-side disc and an output-side disc, each of surfaces of which opposite to each other have a concave cross section of a circular arc shape, and freely rotatable power rollers clamped between these discs are combined. The input-side disc is coupled to drive an input shaft such that the input-side disc can move along the input shaft to which torque is input while the output-side disc is attached opposite to the input-side disc such that the output-side disc is rotatable relative to the input shaft and that movement away from the input-side disc is limited.

In such a single-cavity toroidal continuously variable transmission, when the input-side disc rotates, the output-side disc inversely rotates via the power rollers and thus rotary motion input to the input shaft is transferred to the output-side disc as inverse rotary motion, which is then transferred from an output gear rotating integrally with the output-side disc. Here, shifting an inclination angle of a rotation axis of the power roller such that a peripheral surface of the power roller abuts against near each of an outer periphery of the input-side disc and the center of the output-side disc increases the speed from the input shaft to the output gear. Inversely, shifting the inclination angle of the rotation axis the power roller such that the peripheral surface of the power roller abuts against near each of the center of the input-side disc and an outer periphery of the output-side disc decreases the speed from the input shaft to the output gear. Moreover, intermediate gear ratios can also be obtained substantially continuously by adjusting the inclination angle of the rotation axis of the power roller as appropriate.

Furthermore, such a single-cavity toroidal continuously variable transmission includes an output-side bearing that is provided behind the output gear and supports a thrust load applied from the output-side disc, an input-side bearing that is provided at an end portion of the input shaft on the side of the output-side disc and supports a thrust load applied from the input-side disc, and a pressing mechanism that presses at least one of the input-side disc and the output-side disc toward a direction such that the input-side disc and output-side disc approach each other.

As one example of such a single-cavity toroidal continuously variable transmission, the one disclosed in Patent Literature 1 is known.

In this single-cavity toroidal continuously variable transmission, an input-side bearing supporting an input shaft having relatively small torque is smaller than an output-side bearing supporting an output shaft having relatively large torque and an input-side inner race and output side inner race of the input-side bearing and output-side bearing are separately provided while an outer race thereof is formed integrally. This allows for downsizing a size of the input-side bearing in the shift direction as well as reducing rolling resistance of the input-side bearing.

Moreover, as another example of the single-cavity toroidal continuously variable transmission as described above, the one disclosed in Patent Literature 2 or the one illustrated in FIG. 3 is known.

The one illustrated in FIG. 3 and the one disclosed in Patent Literature 2 have substantially the same configuration except for the pressing mechanism. Therefore, the one illustrated in FIG. 3 is described here while descriptions on the one disclosed in Patent Literature 2 is omitted.

FIG. 3 is a cross-sectional view illustrating a single-cavity toroidal continuously variable transmission. In FIG. 3, symbol 1 denotes an input shaft, 2 denotes an input-side disc, 3 denotes an output-side disc, 4 denotes a power roller, and 5 denotes a pressing mechanism that presses the input-side disc 2 toward the output-side disc 3.

Incidentally, the power roller 4 is supported in a freely rotatable manner by a trunnion not illustrated.

The pressing mechanism 5 is hydraulic and provided in a manner rotatable integrally with the input shaft 1 and includes a cylinder 51 that forms a hydraulic chamber between a back surface of the input-side disc 2 and the cylinder 51 and a first and second pistons 55 and 56 that is provided inside the cylinder 51 and reciprocates in a direction along the input shaft 1 by hydraulic pressure.

A tip end portion of the cylinder 51 is engaged with an outer peripheral portion of the input-side disc 2 in an integrally rotatable manner and the input-side disc 2 is fit to the input shaft 1 in a movable manner along the shaft direction. Therefore, when the input shaft 1 rotates, the cylinder 51 also rotates with the input shaft 1. Due to rotation of the cylinder 51, the input-side disc 2 engaged to the cylinder 51 also rotates.

Furthermore, the input-side disc 2 is pressed toward the output-side disc 3 when oil is supplied to a first oil chamber 50a and a second oil chamber 50b. That is, when oil is supplied to the first oil chamber 50a, the input-side disc 2 is pressed toward the output-side disc 3 by hydraulic pressure since leftward movement of the first piston 55 is limited. Also, when oil is supplied to the second oil chamber 50b, the input-side disc 2 is pressed toward the output-side disc 3 by the second piston 56. Moreover, when oil is supplied to the second oil chamber 50b, the input shaft 1 is pulled leftward via the cylinder 51. This results in a thrust load applied to an input-side bearing 10, which will be described later. Incidentally, the first oil chamber 50a is provided with a disc spring 57 that applies a preload. This disc spring 57 also presses the input-side disc 2 toward the output-side disc 3.

The output-side disc 3 is supported by the input shaft 1 via a needle bearing in a freely rotatable manner. Furthermore, the output-side disc 3 is spline-connected to an outer periphery of one end portion of an output shaft (flange) 7 of a cylindrical shape formed integrally with an output gear 6 for output. This allows for the output-side disc 3 and output gear 6 to rotate integrally. The other end portion of the output shaft 7 is supported by a casing (not illustrated) via an output-side bearing 11. Therefore, the output-side disc 3 is limited of rightward movement along the input shaft 1 by the output-side bearing 11 via the output gear 6. Therefore, when the pressing mechanism 5 presses the input-side disc 2 toward the output-side disc 3, the output-side disc 3 is pressed rightward via the power roller 4, which results in a thrust load applied to the output-side bearing 11 via the output shaft 7.

Moreover, a right end portion of the input shaft 1 is spline-connected to a shaft portion 8a of an input gear 8 for rotation with the input shaft 1 and is limited of movement toward the right end side of the input shaft 1 by a nut 9. Also, the shaft portion 8a of the input gear 8 is supported by a casing (not illustrated) via the input-side bearing 10.

Therefore, as described above, when the input shaft 1 is pulled leftward by the pressing mechanism 5, the input-side bearing 10 is applied with a thrust load via the input gear 8.

Incidentally, the input-side bearing 10 and output-side bearing 11 are angular bearings and arranged back to back.

In such a single-cavity toroidal continuously variable transmission, the input-side bearing 10 to support the thrust load applied from the input-side disc 2 and the output-side bearing 11 to support the thrust load applied from the output-side disc 3 are in the same size.

Moreover, still another example of the single-cavity toroidal continuously variable transmission as described above is illustrated in FIG. 4.

FIG. 4 is a cross-sectional view illustrating a single-cavity toroidal continuously variable transmission. In FIG. 4, symbol 1 denotes a shaft (supporting shaft), 2 denotes an input-side disc, 3 denotes an output-side disc, 4 denotes a power roller, and 5 denotes a pressing mechanism that presses the input-side disc 2 toward the output-side disc 3.

The pressing mechanism 5 is a loading cam type. That is, the shaft (supporting shaft) 1 is provided with the input-side disc 2 in a freely rotatable manner therearound and movable therealong. A cam plate 13 is arranged on a back surface side of the input-side disc 2. This cam plate 13 has a disc shape and includes a cylindrical portion in the center. A cylindrical shaft portion 14a of an input gear 14 is inserted in and fixed to this cylindrical portion. The shaft (supporting shaft) 1 is inserted through an inner diameter side of the shaft portion 14a. The shaft portion 14a is supported by the shaft (supporting shaft) 1 in a freely rotatable manner via a bearing. The cam plate 13 rotates integrally with the input gear 14.

A side surface of the input gear 14 facing the cam plate 13 side includes a concave portion. This concave portion is provided with a disc spring 15 that applies a preload. This disc spring 15 presses the cam plate 13 toward the input-side disc 2.

Furthermore, a plurality of rollers 16 are provided between the input-side disc 2 and cam plate 13. When the input gear 14 rotates, the cam plate 13 also rotates according to that rotation and the rollers 16 are pressed against a cam surface included in the input-side disc 2 by a cam surface formed on the cam plate 13, thereby pressing the input-side disc 2 toward the output-side disc 3.

A back surface side of the input gear 14 includes a cylindrical portion 14b. An input-side bearing 20 is fitted inside the cylindrical portion 14b. The input-side bearing 20 is limited of leftward movement along the shaft (supporting shaft) 1 direction by a flange portion 1a included in the shaft (supporting shaft) 1 at a left end portion thereof.

The left end portion of the shaft (supporting shaft) 1 is supported by the input-side bearing 20. The input gear 14 is rotatable relative to the shaft (supporting shaft) 1 via the input-side bearing 20. The input-side bearing 20 is an angular bearing.

When the pressing mechanism 5 presses the input-side disc 2 toward the output-side disc 3, reaction thereof is applied to the input-side bearing 20 as a thrust load via the cam plate 13 and input gear 14.

Also, the shaft (supporting shaft) 1 supports the output-side disc 3 in a freely rotatable manner with a bearing. The output-side disc 3 is arranged opposite to the input-side disc 2 with power rollers 4 clamped therebetween.

A back surface side of the output-side disc 3 is provided with an output gear 18 in a manner freely rotatable around the shaft (supporting shaft) 1. The output gear 18 is provided in a manner rotatable integrally with the output-side disc 3.

A back surface side of the output gear 18 includes a cylindrical portion 18b. An output-side bearing 21 is fitted inside the cylindrical portion 18b. The output-side bearing 21 is an angular bearing.

A cylindrical supporting member 22 is fixed to a right end portion of the shaft (supporting shaft) 1. The supporting member 22 is inserted in and fixed to the output-side bearing 21. Therefore, the output gear 18 is rotatable relative to the shaft (supporting shaft) 1 via the output-side bearing 21.

Furthermore, a ring-shaped fixing member 23 abuts against a flange portion 22a of the supporting member 22 and the fixing member 23 is fixed to the shaft (supporting shaft) 1. Therefore, the output-side bearing 21 is limited of rightward movement along the shaft (supporting shaft) 1 direction.

When the pressing mechanism 5 presses the output-side disc 3 rightward via the input-side disc 2 and the power rollers 4, a thrust load is applied to the output-side bearing 21 via the output gear 18.

In such a single-cavity toroidal continuously variable transmission, the input-side bearing 20 to support the thrust load applied from the input-side disc 2 and the output-side bearing 21 to support the thrust load applied from the output-side disc 3 are in the same size.

CITATION LIST

Patent Literature

Patent Literature 1: JP 2979945 A
Patent Literature 2: JP 11-132301 A

SUMMARY OF INVENTION

Technical Problem

Meanwhile, a single-cavity toroidal continuously variable transmission has different axial forces acting on an input-side disc and an output-side disc as illustrated in FIG. 5 and thus requires support bearings (input-side bearing and output-side bearing) to support the respective axial forces (thrust loads).

For low fuel consumption, mitigation of support bearing loss on a speed increasing side with a low load is desired. On the speed increasing side, however, rotation speed of the output-side bearing increases with a lower load and thus there is a concern that gyro slippage may occur.

That is, in a state where the output-side disc is rotating at high speed, rotation speed of a ball as a rolling body included in the output-side bearing increases and centrifugal force acting on the ball increases, thus resulting in occurrence of gyro slippage. When such gyro slippage occurs, considerable abrasion occurs at a portion of contact between a rolling surface of the ball and outer and inner ring raceways of the output-side bearing. This results in reduced durability of the output-side bearing.

In the conventional single-cavity toroidal continuously variable transmission as illustrated in Patent Literature 1, the input-side bearing is smaller than the output-side bearing and thus there is a concern about bearing breakage due to gyro slippage on the speed increasing side with a low load. Moreover, it is required to apply excessive axial force in order to avoid gyro slippage and thus there is a concern about increased loss and a shorter service life of the variator (toroidal transmission mechanism) and the support bearing.

Also, in the conventional single-cavity toroidal continuously variable transmissions as illustrated in Patent Literature 2 and FIGS. 3 and 4, bearings of the same size are used for the input-side bearing and the output-side bearing and thus there is a concern about bearing breakage due to gyro slippage on the speed increasing side with a low load. Moreover, it is required to apply excessive axial force in order to avoid gyro slippage and thus there is a concern about increased loss and a shorter service life of the variator (toroidal transmission mechanism) and the support bearing.

The present invention has been devised in consideration of the above circumstances with an object to provide a single-cavity toroidal continuously variable transmission capable of suppressing gyro slippage and achieving mitigation of bearing loss and a longer service life.

Solution to Problem

In order to achieve the above object, a single-cavity toroidal continuously variable transmission of the present invention includes: a toroidal transmission mechanism including a shaft, an input-side disc, an output-side disc, the input-side disc and the output-side disc being supported by the shaft opposite to each other, and a power roller clamped between the input-side disc and the output-side disc; a pressing mechanism that applies pressing force to at least one of the input-side disc and the output-side disc such that the input-side disc and the output-side disc approach each other along the shaft direction; an input-side bearing that supports a thrust load applied from the input-side disc by the pressing mechanism via the input-side disc and/or the output disc and the power roller; and an output-side bearing that supports a thrust load applied from the output-side disc by the pressing mechanism via the output-side disc and/or the input-side disc and the power roller, where a pitch circle diameter (PCD) of the output-side bearing is smaller than that of the input-side bearing.

In the present invention, since the pitch circle diameter (PCD) of the output-side bearing is smaller than that of the input-side bearing, centrifugal force acting on the ball in the output-side bearing on the speed increasing side with a low load can be suppressed. Therefore, gyro slippage can be suppressed and mitigation of bearing loss can be achieved.

Also, a single-cavity toroidal continuously variable transmission of the present invention includes: a toroidal transmission mechanism including a shaft, an input-side disc, an output-side disc, the input-side disc and the output-side disc being supported by the shaft opposite to each other, and a power roller clamped between the input-side disc and the output-side disc; a pressing mechanism that applies pressing force to at least one of the input-side disc and the output-side disc such that the input-side disc and the output-side disc approach each other along the shaft direction; an input-side bearing that supports a thrust load applied from the input-side disc by the pressing mechanism via the input-side disc and/or the output disc and the power roller; and an output-side bearing that supports a thrust load applied from the output-side disc by the pressing mechanism via the output-side disc and/or the input-side disc and the power roller, where a ball diameter of the output-side bearing is smaller than that of the input-side bearing.

In the present invention, since the ball diameter of the output-side bearing is smaller than that of the input-side bearing, centrifugal force acting on the ball in the output-side bearing on the speed increasing side with a low load can be suppressed. Therefore, gyro slippage can be suppressed and mitigation of bearing loss can be achieved.

Also, a single-cavity toroidal continuously variable transmission of the present invention includes: a toroidal transmission mechanism including a shaft, an input-side disc, an output-side disc, the input-side disc and the output-side disc being supported by the shaft opposite to each other, and a power roller clamped between the input-side disc and the output-side disc; a pressing mechanism that applies pressing force to at least one of the input-side disc and the output-side disc such that the input-side disc and the output-side disc approach each other along the shaft direction; an input-side bearing that supports a thrust load applied from the input-side disc by the pressing mechanism via the input-side disc and/or the output disc and the power roller; and an output-side bearing that supports a thrust load applied from the output-side disc by the pressing mechanism via the output-side disc and/or the input-side disc and the power roller, where a groove R ratio of the output-side bearing is smaller than that of the input-side bearing.

Here, the groove R ratio of the bearing is defined as $(r/D) \times 100$ where a radius of curvature of a raceway groove of a toric shape included in a race ring of the bearing is denoted as $r$ and a diameter of a ball rolling in the raceway groove is denoted as $D$.

In the present invention, since the groove R ratio of the output-side bearing is smaller than that of the input-side bearing, a longer service life can be achieved even when the pitch circle diameter (PCD) and ball diameter of the output-side bearing are smaller than those of the input-side bearing.

Advantageous Effects of Invention

According to the present invention, gyro slippage can be suppressed and mitigation of bearing loss can be achieved since the pitch circle diameter (PCD) of the output-side bearing is smaller than that of the input-side bearing, the ball diameter of the output-side bearing is smaller than that of the input-side bearing, or the groove R ratio of the output-side bearing is smaller than that of the input-side bearing.

BRIEF DESCRIPTION OF DRAWINGS

FIG. 1 is a cross-sectional view illustrating a single-cavity toroidal continuously variable transmission according to an embodiment of the present invention.

FIG. 2 is an enlarged cross-sectional view illustrating a ball of an input-side bearing and output-side bearing and the vicinity thereof of the single-cavity toroidal continuously variable transmission according to the embodiment of the present invention.

FIG. 3 is a cross-sectional view illustrating an example of a conventional single-cavity toroidal continuously variable transmission.

FIG. 4 is a cross-sectional view illustrating another example of a conventional single-cavity toroidal continuously variable transmission.

FIG. 5 is a graph illustrating input-side axial force and output-side axial force in a single-cavity toroidal continuously variable transmission.

DESCRIPTION OF EMBODIMENT

Hereinafter, an embodiment of the present invention will be described with reference to the drawings.

FIG. 1 is a cross-sectional view illustrating a single-cavity toroidal continuously variable transmission according to an embodiment of the present invention.

As illustrated in FIG. 1, the single-cavity toroidal continuously variable transmission according to the present embodiment includes a toroidal transmission mechanism (variator) 40 including an input shaft (shaft) 31 as a torque input shaft rotatably driven by a driving source including an engine (not illustrated) or the like, an input-side disc 32 attached to the input shaft 31 in a rotatable manner therearound and movable therealong, an output-side disc 33 rotatably attached to the input shaft 31 opposite to the input-side disc 32 such that movement away from the input-side disc 32 is limited, and a freely rotatable power roller 34 clamped between opposite concave surfaces of a circular arc shape of the input-side disc 32 and output-side disc 33, and a pressing mechanism 41 that presses the input-side disc 32 toward the output-side disc 33.

The pressing mechanism 41 is a loading cam type. That is, the input shaft 31 is inserted through the input-side disc 32 in a manner freely slidable relative to the shaft direction and rotatable therearound. Moreover, a left end portion of the input shaft 31 is provided with a cam plate 36 of a disc shape. The cam plate 36 is joined to a flange portion 31a included in the left end portion of the input shaft 31 in an integrally rotatable manner. Furthermore, the cam plate 36 abuts against the flange portion 31a, thereby limiting leftward movement along the input shaft 31.

Between the cam plate 36 and input-side disc 32, a disc spring 37 that applies a preload is provided near the input shaft 31. This disc spring 37 presses the input-side disc 32 toward the output-side disc 33.

Furthermore, a plurality of rollers 38 are provided between the input-side disc 32 and cam plate 36. When the input shaft 31 rotates, the cam plate 36 also rotates according to that rotation and the rollers 38 are pressed against a cam surface included in the input-side disc 32 by a cam surface formed on the cam plate 36, thereby pressing the input-side disc 32 toward the output-side disc 33.

Also, the input shaft 31 supports the output-side disc 33 in a freely rotatable manner with a needle bearing. The output-side disc 33 is arranged opposite to the input-side disc 32 with power rollers 34 clamped therebetween.

A back surface side of the output-side disc 33 is provided with an output gear 42 in a manner freely rotatable around the input shaft 31 with a needle bearing. The output gear 42 is integrally fixed to the output-side disc 33. Therefore, the output gear 42 rotates with the output-side disc 33 around the input shaft 31.

A back surface side of the output gear 42 includes a concave portion of a toric shape. A race ring 47 included in an output-side bearing 46 is fitted in this concave portion. The other race ring 48 is provided coaxially with and opposite to the race ring 47. The race ring 48 is formed with a larger diameter than that of the race ring 47 and is fixed to a casing not illustrated. A plurality of balls 49 as rolling bodies are provided between the race rings 47 and 48 at a predetermined interval in a circumferential direction. The balls thereby roll in a raceway groove formed on each of the opposite surfaces of the race rings 47 and 48.

Such an output-side bearing 46 is a thrust bearing and supports a thrust load applied from the output-side disc 33 via the output gear 42. That is, when the pressing mechanism 41 presses the input-side disc 32 toward the output-side disc 33, this pressing force is applied to the output-side disc 33 via the power roller 34 and is further applied to the output-side bearing 46 from the output-side disc 33 via the output gear 42 as the thrust load. Therefore, the load is supported by the output-side bearing 46.

Also, a race ring 44 included in an input-side bearing 43 is fixed to a right end portion of the input shaft 31 coaxially with the input shaft 31. The race ring 44 abuts against a cotter 31b fixed to an end portion of the input shaft 31 in the right side from the race ring 44. The cotter 31b limits movement of the race ring 44 toward the right end side of the input shaft 31.

The other race ring 48 is provided on the other side from the cotter 31b opposite to and coaxially with the race ring 44. Therefore, the race ring 48 is a common race ring to the input-side bearing 43 and output-side bearing 46.

A plurality of balls 45 as rolling bodies are provided between the race rings 44 and 48 at a predetermined interval in a circumferential direction. The balls thereby roll in a raceway groove formed on each of the opposite surfaces of the race rings 44 and 48.

Such an input-side bearing 43 is a thrust bearing and supports a thrust load applied from the input-side disc 32 via the input shaft 31. That is, when the pressing mechanism 41 presses the input-side disc 32 toward the output-side disc 33, reaction thereof is applied to the input shaft 31 via the cam plate 36 and pulls the input shaft 31 to the left and thus is applied to the input-side bearing 43 from the input shaft 31 as the thrust load. Therefore, the load is supported by the input-side bearing 43.

In the input-side bearing 43 and output-side bearing 46 as described above, a pitch circle diameter (PCD) of the output-side bearing 46 is smaller than that of the input-side bearing 43. That is, a pitch circle diameter of the balls 49 included in the output-side bearing 46 is smaller than a pitch circle diameter of the balls 45 included in the input-side bearing 43.

Also, a ball diameter of the output-side bearing 46 is smaller than that of the input-side bearing 43. That is, a diameter of the balls 49 included in the output-side bearing 46 is smaller than a diameter of the balls 45 included in the input-side bearing 43.

Moreover, a groove R ratio of the output-side bearing 46 is smaller than that of the input-side bearing 43. That is, as illustrated in FIG. 2, raceway grooves 50 and 50 that rollably retain the balls 45 and 49 are formed opposite to each other in the input-side bearing 43 and output-side bearing 46, respectively.

In the input-side bearing 43, the raceway groove 50 is formed in each of the race ring 44 and the other race ring 48 while in the output-side bearing 46 the raceway groove 50 is formed in each of the race ring 47 and the other race ring 48.

The raceway grooves 50 and 50 are included on surfaces where the race rings 44 and 47 and race rings 48 and 48 and balls 45 and 49 are in contact as in a toric shape with a cross section thereof formed as an arc shape. Here, a diameter of the balls 45 and 49 is defined as D, a radius of curvature of the raceway groove 50 as r, and a groove R ratio as $(r/D) \times 100$. That is, groove R ratio = $(r/D) \times 100$ holds.

Moreover, in the present embodiment, as described above, the groove R ratio of the output-side bearing 46 is smaller than that of the input-side bearing 43.

Here, when the groove R ratio is smaller, namely, the radius of curvature of the raceway groove r is smaller, or the ball diameter D is larger, a contact ellipse becomes larger and thus surface pressure can be reduced.

In the present embodiment, as described above, since the diameter D of the ball 49 of the output-side bearing 46 is smaller than that of the ball 45 of the input-side bearing 43, by reducing the radius of curvature r of the raceway groove 50 such that the groove R ratio of the output-side bearing 46 is smaller than that of the input-side bearing 43, a contact ellipse in a portion of contact between the ball 49 of the output-side bearing 46 and the raceway groove 50 becomes larger, thus allowing for reducing surface pressure. As a result, a longer service life of the output-side bearing 46 can be achieved.

As described above, according to the present embodiment, the pitch circle diameter (PCD) of the output-side bearing 46 is smaller than that of the input-side bearing 43 and the ball diameter of the output-side bearing 46 is smaller than that of the input-side bearing 43. Therefore, centrifugal force acting on the ball 49 of the output-side bearing 46 on the speed increasing side with a low load can be suppressed. Therefore, gyro slippage can be suppressed and bearing loss can be mitigated.

Furthermore, since the groove R ratio of the output-side bearing 46 is smaller than that of the input-side bearing 43, a longer service life can be achieved even when the pitch circle diameter (PCD) and ball diameter of the output-side bearing 46 are smaller than those of the input-side bearing 43.

Incidentally, the input-side bearing 43 and output-side bearing 46 are thrust bearings in the present embodiment; however, an input-side bearing and output-side bearing are not limited to thrust bearings.

For example, in the conventional single-cavity toroidal continuously variable transmission as illustrated in FIG. 3 and FIG. 4, applying the present invention to the input-side bearings 10 and 20 and output-side bearings 11 and 21, which are angular bearings, can also provide similar effects. The point is, as along as an input-side bearing supports a thrust load applied from an input-side disc and an output-side bearing supports a thrust load applied from an output-side disc, applying the present invention can provide similar effects.

Moreover, the pressing mechanism is a loading cam type in the present embodiment; however, for example, a hydraulic pressing mechanism as illustrated in FIG. 3 may be used.

Furthermore, the input-side bearing 43 and output-side bearing 46 are arranged behind the output-side disc 33 in the present embodiment; however, the input-side bearing 43 and output-side bearing 46 are not necessarily arranged behind the output-side disc 33 in the present invention. For example, the input-side bearing 43 and output-side bearing 46 may be disposed behind the input-side disc 32 and output-side disc 33.

INDUSTRIAL APPLICABILITY

The present invention can be applied not only to various single-cavity half-toroidal continuously variable transmissions but also to various single-cavity full-toroidal continuously variable transmissions.

REFERENCE SIGNS LIST

31 Input shaft (shaft)
32 Input-side disc
33 Output-side disc
34 Power roller
43 Input-side bearing
46 Output-side bearing
45, 49 Ball

The invention claimed is:

1. A single-cavity toroidal continuously variable transmission, comprising:
   a toroidal transmission mechanism, comprising a shaft, an input-side disc, an output-side disc, the input-side disc and the output-side disc being supported by the shaft opposite to each other, and a power roller clamped between the input-side disc and the output-side disc;
   a pressing mechanism that applies pressing force to at least one of the input-side disc and the output-side disc such that the input-side disc and the output-side disc approach each other along the shaft direction;
   an input-side bearing that supports a thrust load applied from the input-side disc by the pressing mechanism via the input-side disc and/or the output-side disc and the power roller; and
   an output-side bearing that supports a thrust load applied from the output-side disc by the pressing mechanism via the output-side disc and/or the input-side disc and the power roller,
   wherein the input-side bearing and the output-side bearing are arranged coaxially, and
   a pitch circle diameter (PCD) of the input-side bearing supporting the input-side disc having relatively small torque is larger than a pitch circle diameter (PCD) of the output-side bearing supporting the output-side disc having relatively large torque.

2. A single-cavity toroidal continuously variable transmission, comprising:
   a toroidal transmission mechanism, comprising a shaft, an input-side disc, an output-side disc, the input-side disc and the output-side disc being supported by the shaft opposite to each other, and a power roller clamped between the input-side disc and the output-side disc;
   a pressing mechanism that applies pressing force to at least one of the input-side disc and the output-side disc such that the input-side disc and the output-side disc approach each other along the shaft direction;
   an input-side bearing that supports a thrust load applied from the input-side disc by the pressing mechanism via the input-side disc and/or the output-side disc and the power roller; and
   an output-side bearing that supports a thrust load applied from the output-side disc by the pressing mechanism via the output-side disc and/or the input-side disc and the power roller,
   wherein the input-side bearing and the output-side bearing are arranged coaxially, and
   a ball diameter of the input-side bearing supporting the input-side disc having relatively small torque is larger than a ball diameter of the output-side bearing supporting the output-side disc having relatively large torque.

3. The single-cavity toroidal continuously variable transmission according to claim 1,
   wherein a groove R ratio of the output-side bearing is smaller than that of the input-side bearing.

4. The single-cavity toroidal continuously variable transmission according to claim 2,
   wherein a groove R ratio of the output-side bearing is smaller than that of the input-side bearing.

* * * * *